United States Patent [19]

Larabell

[11] Patent Number: 5,921,816

[45] Date of Patent: Jul. 13, 1999

[54] SCSI ADAPTER FOR A COMPUTER SYSTEM HAVING AN INTERNAL SCSI BUS

[76] Inventor: Henri Larabell, 5845 Killarney Cir., San Jose, Calif. 95138

[21] Appl. No.: 08/555,970

[22] Filed: Nov. 13, 1995

[51] Int. Cl.$^6$ .................................................. H01R 25/00
[52] U.S. Cl. ........................................... 439/638; 361/686
[58] Field of Search ................................ 439/638, 76.1; 361/686, 683, 685

[56] References Cited

U.S. PATENT DOCUMENTS

| | | | |
|---|---|---|---|
| 5,518,412 | 5/1996 | Larabell | 439/157 |
| 5,598,318 | 1/1997 | Dewitt | 361/683 |

Primary Examiner—Neil Abrams
Assistant Examiner—T C Patel

[57] ABSTRACT

A SCSI adapter for extending an internal SCSI bus of a computer system having a housing and internal memory storage devices is disclosed herein. The SCSI adapter enables connection of external memory storage devices to the internal SCSI bus. The SCSI adapter includes an adapter plate and a SCSI bus extension. The adapter plate attaches within the housing to the internal SCSI bus and to the SCSI bus extension. The SCSI bus extension extends from the adapter plate and attaches to the housing to enable connection of external memory storage devices with the internal SCSI bus.

3 Claims, 5 Drawing Sheets

SCSI ADAPTER FOR A COMPUTER SYSTEM HAVING AN INTERNAL SCSI BUS

FIELD OF THE INVENTION

This invention relates generally to computer systems. More particularly, this invention relates to computer systems having an internal SCSI bus.

BACKGROUND OF THE INVENTION

The demand for increased memory storage capacity in computer systems is driven by developments in computing such as those relating to multimedia, database and communications technology. Desktop computers are now able to manage databases, generate and display video images and digitally recorded sound. Such applications require much more memory storage capacity than many textual documents require.

With the increased demand for memory storage, there is a need to adapt presently existing computer systems with more powerful memory storage systems. One way to provide more powerful memory storage systems to existing computer systems is to attach additional memory storage devices to an existing system. Many systems, however, are limited in the number of memory storage devices which can be attached. What is desired is a way to expand the number of memory storage devices which can be attached to a computer system.

Small Computer Systems Interface (SCSI) is a known architecture having an interface with at least one SCSI bus which links memory storage devices to a computer system. A single SCSI bus may attach to numerous (e.g. 8) memory storage devices.

There is at least one computer system on the market which includes an internal and an external SCSI bus. An example of such a computer system is marketed under the trade name "Indigo 2" by Silicon Graphics, Inc. The computer includes a housing which encases a motherboard having a processor. The housing has adequate space for three internal memory storage devices. The internal SCSI bus interconnects the internal memory storage devices to the motherboard. The external SCSI bus extends from the motherboard to an external connector which is connectable with external memory storage devices which are external to the housing. An example of a computer system having an internal and an external SCSI bus is shown in FIG. 1.

Although, there is sufficient space in the computer system housing to house up to three internal memory storage devices, the internal SCSI bus has sufficient throughput capacity to enable attachment with more than three memory storage devices. What is desired is a way of attaching additional memory storage devices to the internal SCSI bus to increase the memory storage capacity of the computer system.

SUMMARY OF THE INVENTION

It is an object of the invention to provide a way of interconnecting external memory storage devices to an internal SCSI bus.

In accordance with the above objects recited above and those that will become apparent below, an adapter plate for interconnecting an internal SCSI bus of a computer system with a SCSI bus extension to enable electronic attachment of external memory storage devices to the internal SCSI bus, comprises:

a first connector attachable with the internal SCSI bus;

a second connector attachable with the SCSI bus extension, whereby, when the first connector attaches to the internal SCSI bus and the second connector attaches with the SCSI bus extension, the adapter plate facilitates attachment of external memory storage devices to the internal SCSI bus.

In a preferred embodiment, the adapter plate attaches with the SCSI bus extension. The SCSI bus extension has a connector attachable with memory storage devices.

In another preferred embodiment, the adapter plate includes a third connector. The adapter plate attaches to a memory storage device carrier to facilitate interconnection of the third connector with an internal memory storage device.

In another preferred embodiment, the adapter plate has a width of approximately six inches and a height of approximately two inches. The adapter plate includes a pair of keyhole mounts, the keyhole mounts being approximately 5⅝" apart to enable attachment of the adapter plate to a memory storage device carrier having pin mounts which are approximately 5⅝" apart.

In another preferred embodiment, the first connector is an eighty pin type connector and the second connector is a fifty pin type connector. The adapter plate includes a circuit assembly which attaches between the first connector and the second connector. The circuit assembly terminates selected pins of the of the first connector to enable electronic compatibility between the first connector and the second connector.

It is an advantage of the present invention to provide an apparatus which interconnects external memory storage devices with an internal SCSI bus of a computer system.

BRIEF DESCRIPTION OF THE DRAWINGS

For a further understanding of the objects and advantages of the present invention, reference should be had to the following detailed description, taken in conjunction with the accompanying drawing figures, in which like parts are given like reference numerals and wherein.

DETAILED DESCRIPTION OF THE INVENTION

Figure 1:
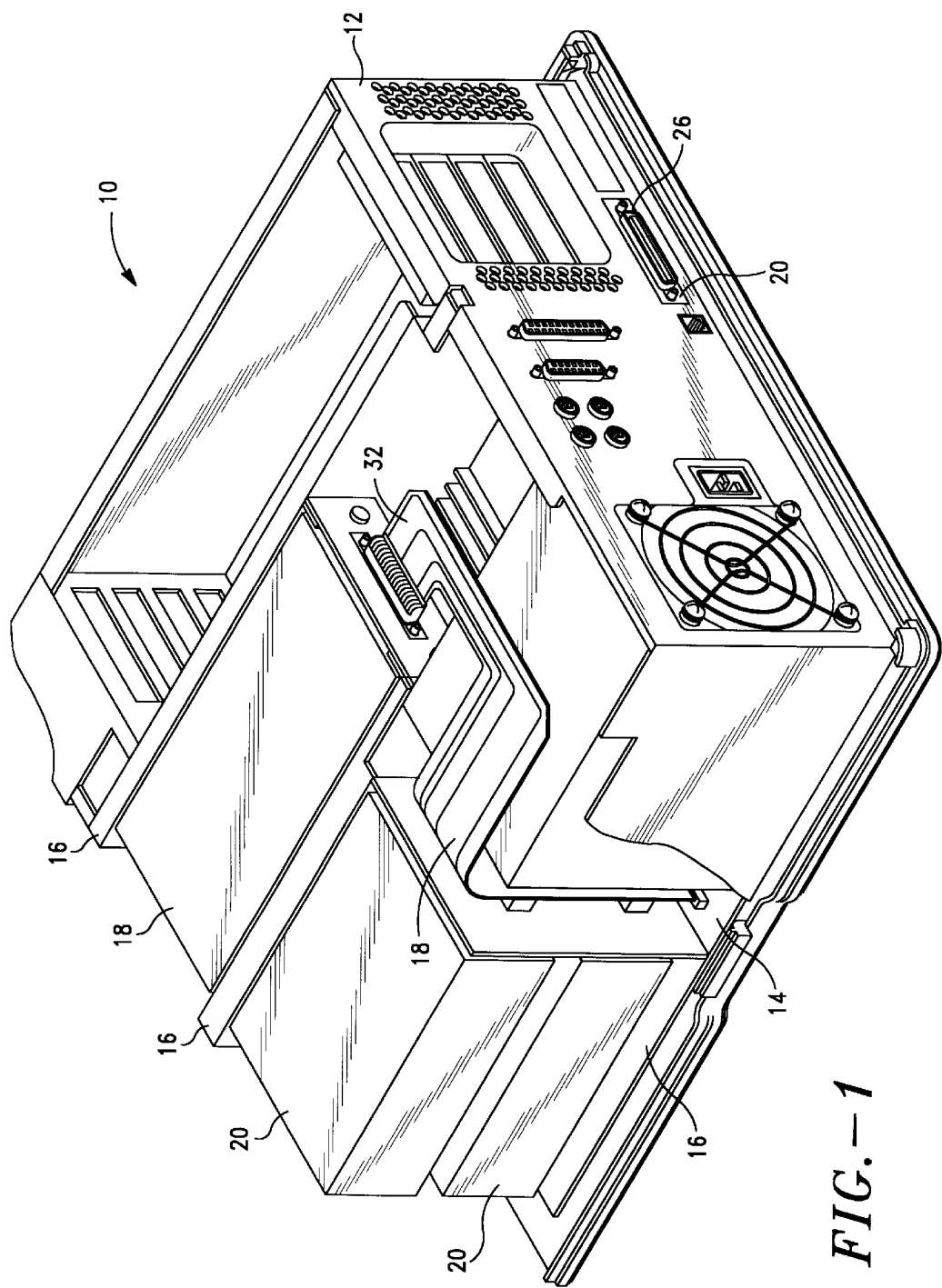
FIG. 1 is a perspective view of a computer system having an internal SCSI bus.

With particular reference to FIG. 1 there is shown a computer system generally designated by the reference numeral 10. The computer system 10 includes a housing 12, a motherboard 14, memory storage device carriers 16 and 17, an internal SCSI bus 18, an external SCSI bus 20 and memory storage devices 22 and 24.

The memory storage device carrier 16 removeably holds the memory storage device 24. The memory storage device carrier 17 removeably holds the memory storage devices 22.

An example of a memory storage device carrier for removeably holding memory storage devices are disclosed in commonly assigned U.S. Pat. No. 5,518,412, issued May 21, 1996, the disclosure of which is incorporated by reference.

Each of the memory storage devices 22 include a 3½ inch hard disk drive. The memory storage device 24 includes a 5¼ inch hard disk drive. The memory storage devices 22 and 24 electronically connect with the internal SCSI bus 18 via the memory storage device carriers 16 and 17, respectively. It can be appreciated that each memory storage device need not include a hard disk drive and may, for example include a floppy disk drive, a tape drive, an optical disk drive, or some other type of memory storage device.

The housing 12 encloses the motherboard 14, a motherboard cooling fan 15, the memory storage devices 22 and 24, and the internal SCSI bus 18. The internal SCSI bus 18 has eighty pin type SCSI connectors 19 which attach to the motherboard 14 and to the memory storage devices 24. The internal SCSI bus 18 electronically connects with the memory storage devices 22 via the memory storage device carrier 17.

The internal SCSI bus 18 has a terminal end 32 which terminally connects with the memory storage device carrier 16 which holds the 5¼ inch memory storage device 24. The term "internal SCSI bus" is defined as a SCSI bus which normally interconnects a motherboard with internal memory storage devices. The term "internal memory storage device" is defined as a memory storage device which is electronically attachable with a computer system and housed within the computer system housing.

The external SCSI bus 20 attaches to the motherboard 14 and includes an external connector 26. The external connector 26 attaches with the housing 12 and enables the connection of external memory storage devices (not shown). The term "external SCSI bus" is broadly defined as a SCSI bus attached to the motherboard and having a connector which normally enables connection of external memory storage devices with the motherboard via SCSI architecture. The term "external memory storage device" is defined as a memory storage device which is electronically attachable with a computer system, but not normally enclosed by the computer system housing 12.

Figure 2:
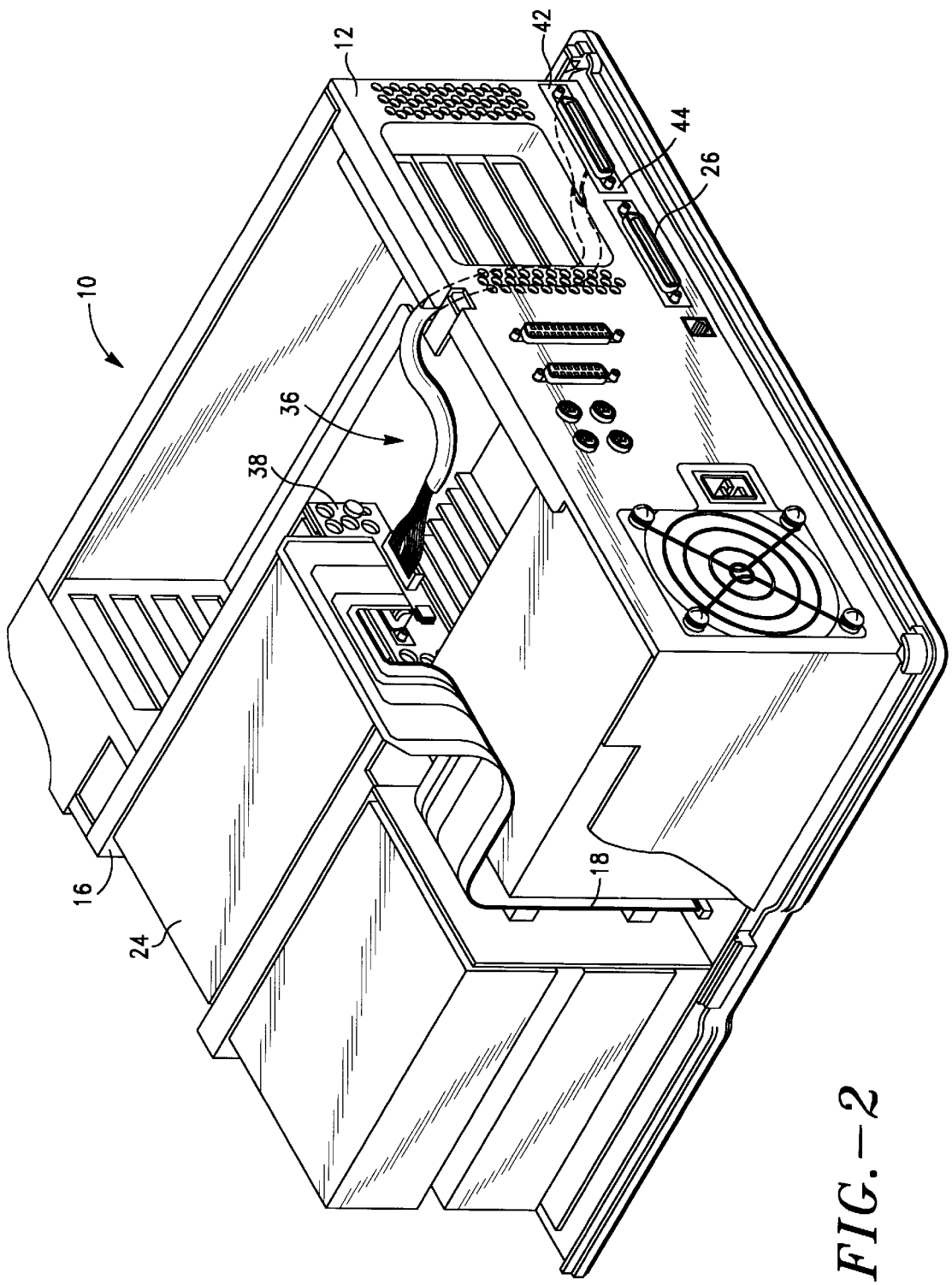
FIG. 2 is a perspective view of the computer of FIG. 1 having a SCSI adapter connected with the internal SCSI bus in accordance with the present invention.

With particular reference to FIG. 2, there is shown the SCSI adapter of the present invention generally designated by the reference numeral 36. The SCSI adapter 36 includes an adapter plate 38, a SCSI bus extension 40 and an external SCSI connector 42.

The adapter plate 38 attaches to the memory storage device carrier 16, to the internal SCSI bus 18 and to the SCSI bus extension 40 to enable additional memory storage devices to attach to the internal SCSI bus 18.

The SCSI bus extension 40 has one end attached to the adapter plate 38 and another end which attaches to the external connector 42. The external connector 42 is connectable with external memory storage devices. Accordingly, the SCSI adapter 36 enables connection of external memory storage devices with the internal SCSI bus 18.

The SCSI adapter 36 includes a fixed port cover 44. The external connector 42 inserts within the fixed port cover 44. The fixed port cover 44 includes a flat plate having threaded holes and bolts which attach the external connector 42 and the SCSI bus extension to the housing 12.

Figure 3:
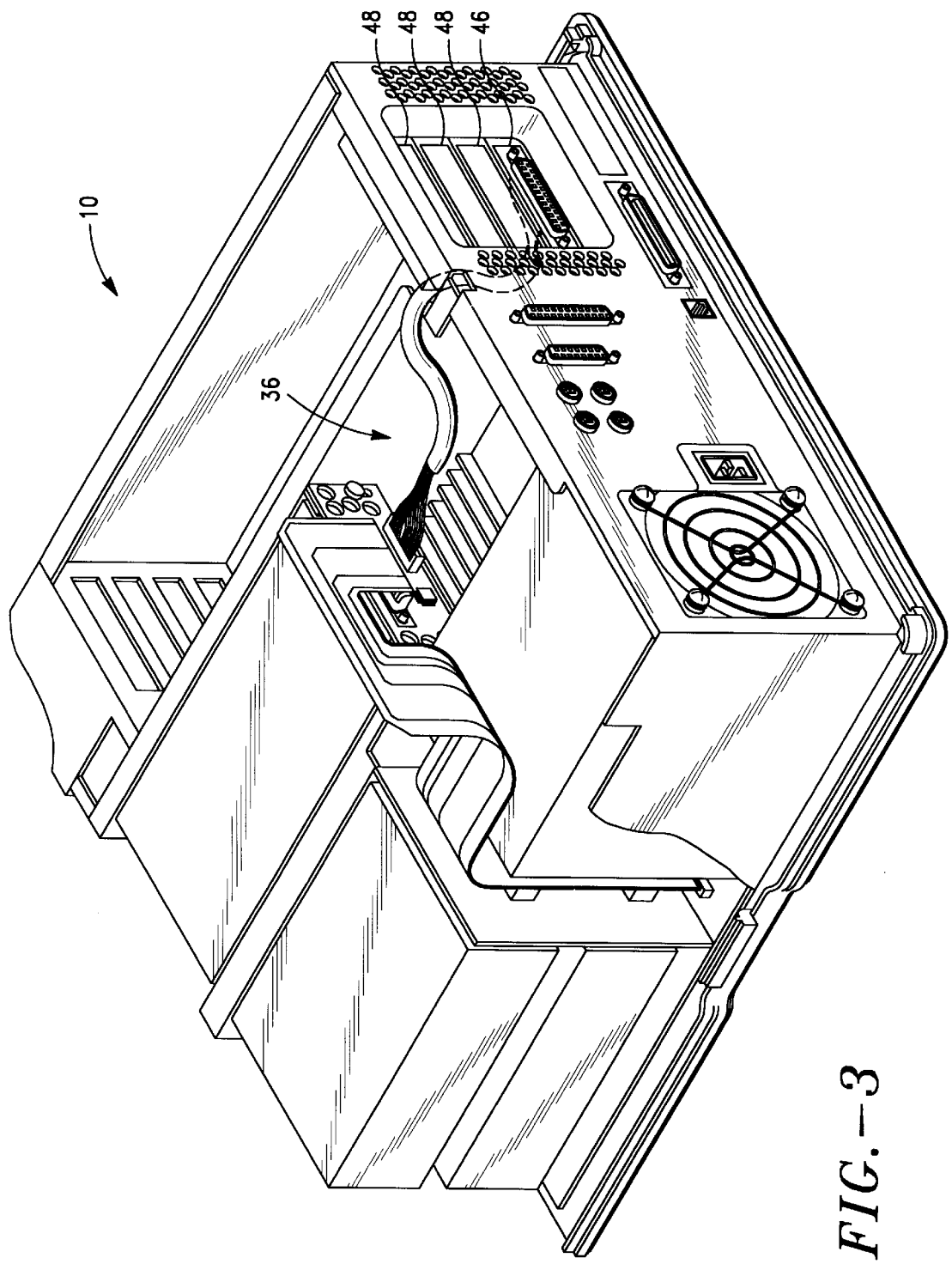
FIG. 3 is a perspective view of the computer of FIG. 1 having a SCSI adapter connected with the internal SCSI bus in accordance with the present invention.

With particular reference to FIG. 3, there is shown the SCSI adapter 36 having a removeably expansion slot cover 46. The housing 12 includes expansion slot openings 48.

One end of the SCSI bus extension 40 attaches to the adapter plate 38. The other end of the SCSI bus extension 40 inserts into the expansion slot cover 46. The expansion slot cover 46 attaches to the housing 12 over one expansion slot opening 48.

Figure 4:
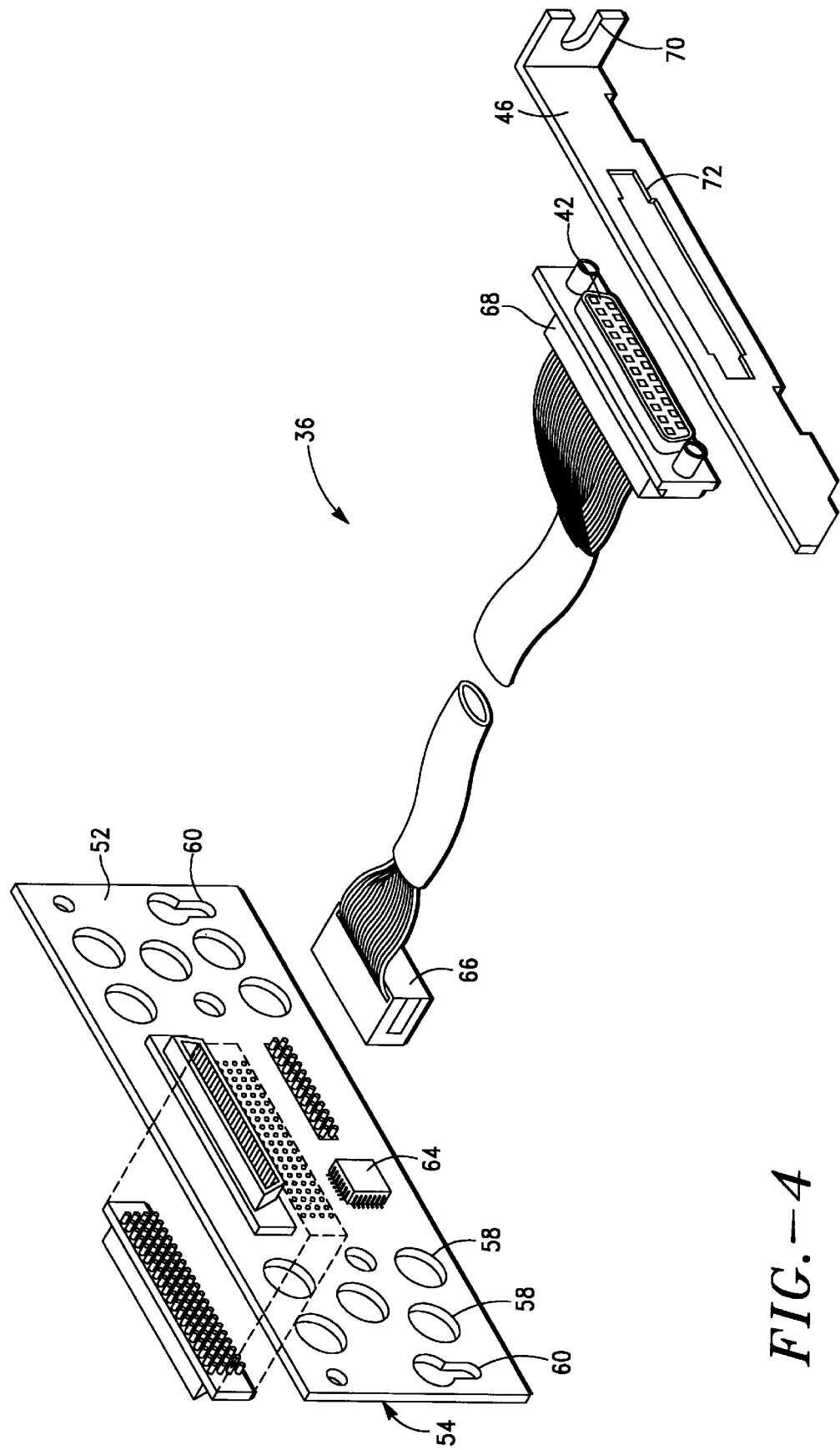
FIG. 4 is an exploded perspective view of the SCSI adapter of FIG. 3.

With particular reference to FIG. 4, there is shown the SCSI adapter 36. The adapter plate 38 has a front side 52 and a rear side 54. Connectors 50 and 56 attach to the front side 52. A connector 51 attaches to the rear side 54. The connectors 50 and 51 are eighty pin type SCSI connectors. The connector 56 is a fifty pin type SCSI connector.

The connector 51 is attachable to a memory storage device having an eighty pin type connector. The connector 50 is attachable with the internal SCSI bus 18 (FIG. 2). The connector 56 is attachable with the SCSI extension 40.

The adapter plate 38 includes numerous vents 58, keyhole mounts 60, fastener holes 62, and a circuit assembly 64. The circuit assembly 64 is formed integral with the adapter plate 38 to electronically interconnect the connectors 50, 51 and 56. The circuit assembly 64 serially connects the connector 50, the connector 51 and the connector 56 to establish electronic communication between the connectors.

Each connector 50, 51 and 56 includes contact pins 65 which extend from each connector 50, 51 and 56 to the circuit assembly to electronically connect with the circuit assembly 64. The circuit assembly 64 electronically disables (terminates) current from selected contact pins 65 of the connector 51 to form a compatible electronic connection between the connector 56 and the internal SCSI bus 18 (FIG. 2) when the SCSI bus 18 attaches to the connector 50. Accordingly, the adapter plate 54 enables a fifty pin type connection with the internal SCSI bus 18 which has eighty pin type connectors.

The SCSI bus extension 40 has two ends. A connector 66 attaches to one end, the external connector 42 attaches to the other end of the SCSI bus extension 40. In one embodiment each connector 66 and 42 are fifty pin type connectors.

The expansion slot cover 46 is generally "L" shaped having one end with a fastener slot 70 and a flat side having an opening 72. The external connector 42 inserts through the opening 72 and attaches to the expansion slot cover to hold the external connector 42 and to enable attachment of external memory storage devices to the internal SCSI bus 18 (FIG. 2) via the external connector 42.

Figure 5:
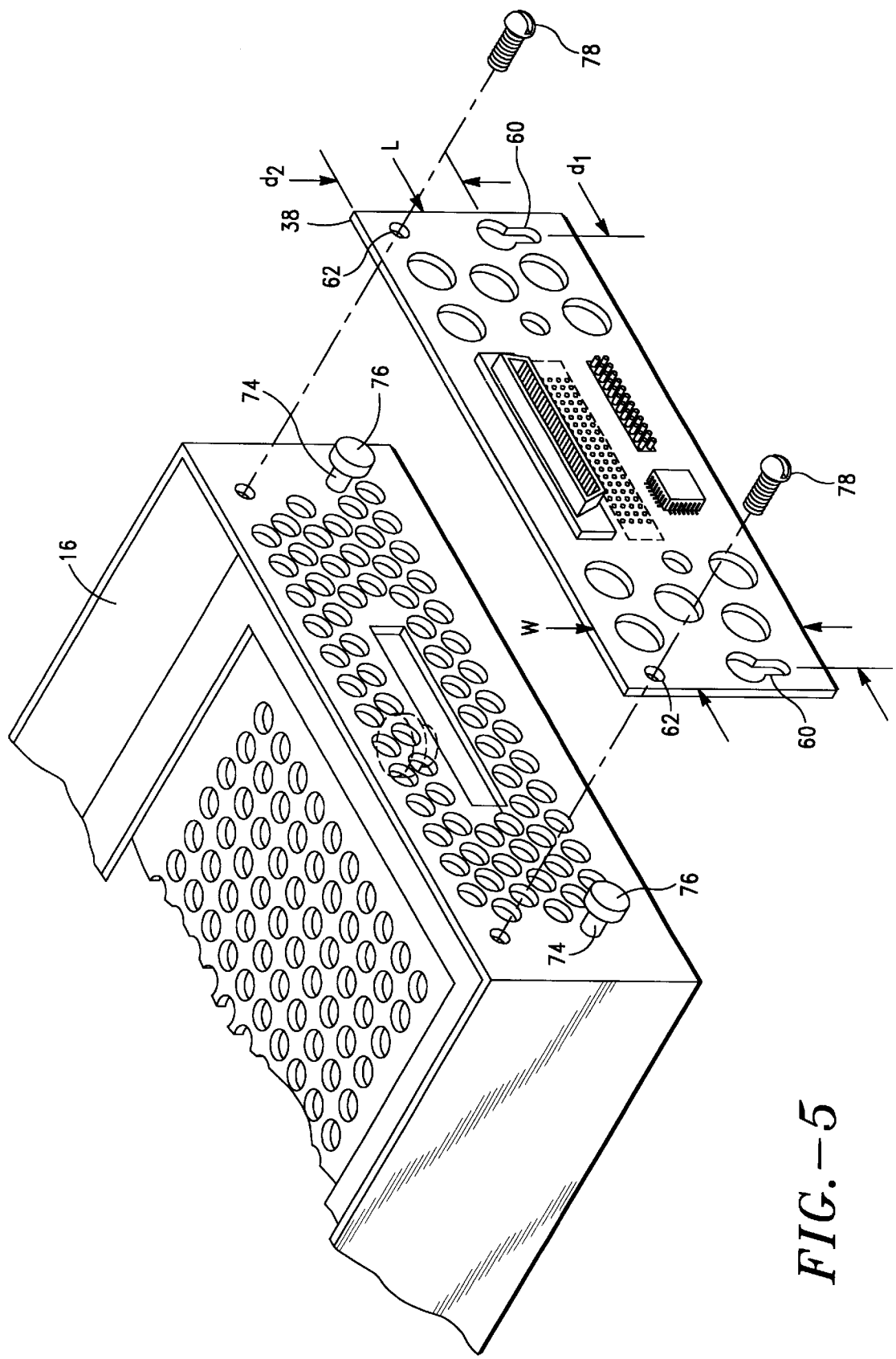
FIG. 5 is an exploded perspective view of the adapter plate of FIG. 4 attached with a memory storage device carrier.

With particular reference to FIG. 5, there is shown the adapter plate 38 and the memory storage device carrier 16. The carrier 16 includes a pair of pins 74. Each pin 74 has a flat head 76. The adapter plate 38 includes the keyhole mounts 60. The keyhole mounts 60 slidably attach over the pins 74 when the adapter plate 38 attaches to the memory storage device carrier 16. The adapter plate 38 includes fasteners 78 which fasten the adapter plate 38 to the memory storage device carrier 16.

The memory storage device carrier 16 has a face plate 82 with an opening 80 for receiving a SCSI connection. The eighty pin connector 51 mounts on the rear side 54 of the adapter plate 38 and extends through the opening 80 to enable interconnection of the connector 51 with the memory storage device 24 (FIG. 2).

The adapter plate 38 has a width "w" of approximately six inches and a height "h" of approximately two inches. "Approximately" as used in this document denotes a value +\-10% of the value.

The keyhole mounts 60 are separated a distance $d_1$ when measured on center. The adapter plate 38 has four sides including a top side 86. The keyhole mounts 60 are positioned a distance $d_2$ from the top side 86. Each keyhole mount 60 has a center 84. In one embodiment, $d_2$ is approximately ¾ of an inch and $d_1$ is approximately 5⅝ inches when measured from the center 84 of each keyhole opening 20.

While the foregoing detailed description has described several embodiments of the platter in accordance with this invention, it is to be understood that the above description merely illustrative and does not limit the scope of the claimed invention. Particularly, the adapter plate may have many shapes and configurations which enable connection of the SCSI bus extension to an internal SCSI bus. Additionally the SCSI bus extension may be adapted to connect with memory storage devices without requiring attachment to the housing. Further, the present invention is useful for expanding memory storage capacity of any of a variety of computer systems. The invention is to be limited only by the claims as set forth below.

What is claimed is:

1. An adapter plate apparatus for interconnecting an internal SCSI bus linking internal memory storage devices of a computer system with a SCSI bus extension to enable electronic attachment of external memory storage devices to the internal SCSI bus, comprising:

a first connector attachable with the internal SCSI bus; and a second connector attachable with the SCSI bus extension, the adapter plate apparatus including a circuit assembly which attaches between the first connector and the second connector, the circuit assembly terminating selected pins of the of the first connector to enable electronic compatibility between the first connector and the second connector, whereby, when the first connector attaches to the internal SCSI bus and the second connector attaches with the SCSI bus extension, adapter plate apparatus interconnects the first and second connectors to facilitate attachment of the external memory storage devices to the internal SCSI bus.

2. An apparatus as set forth in claim 1, wherein the first connector is an eighty pin type connector and the second connector is a fifty pin type connector.

3. A SCSI adapter for use in a computer housing having an internal SCSI bus linking internal memory storage devices wherein the adapter comprises:

an adapter plate attachable with the internal SCSI bus; and a SCSI bus extension having one end attached to the adapter plate and another end attachable with the computer housing for connecting with external memory storage devices, the adapter plate including a first eighty pin type SCSI connector which is connectable with the internal SCSI bus, a second eighty pin type SCSI connector which is connectable with a memory storage device, and a fifty pin type SCSI connector which attaches to one end of the SCSI bus extension, the adapter plate including a circuit assembly which terminates selected pins of the first eighty pin type SCSI connector to enable the adapter plate to electronically interconnect the first eighty pin type SCSI connector with the fifty pin type SCSI connector of the SCSI bus extension, whereby the adapter enables the internal SCSI bus to connect with external memory storage devices coupled with the other end of the SCSI bus extension attached to the computer housing.

* * * * *